Feb. 18, 1947. E. H. WORTHINGTON Re. 22,845

LAWN MOWER

Original Filed July 23, 1940 2 Sheets-Sheet 1

INVENTOR
EDWARD H. WORTHINGTON
BY John E. Hubbell
ATTORNEY

Feb. 18, 1947. E. H. WORTHINGTON Re. 22,845

LAWN MOWER

Original Filed July 23, 1940 2 Sheets-Sheet 2

INVENTOR
EDWARD H. WORTHINGTON
BY
John E. Hubbell
ATTORNEY

Reissued Feb. 18, 1947 Re. 22,845

UNITED STATES PATENT OFFICE 22,845

LAWN MOWER

Edward H. Worthington, East Stroudsburg, Pa.

Original No. 2,253,924, dated August 26, 1941, Serial No. 346,942, July 23, 1940. Application for reissue August 5, 1946, Serial No. 688,398

15 Claims. (Cl. 56—253)

The present invention relates to lawnmowers of the usual type, comprising a rotating fly knife and a cooperating non-rotatable bed knife, and a general object of the present invention is to provide such a lawnmower with improved means for maintaining the proper relation between the fly knife and bed knife cutting edges, including provisions for automatically effecting the relative adjustments of the knives required to compensate for cutting edge wear.

Another general object of the present invention is to provide a lawnmower of the type specified with improved bed knife supporting means, and, in particular, with bed knife supporting means permitting the use of a bed knife of a desirable type and form not practically usable in a lawnmower having the usual bed knife supporting means.

The rotating fly knife of a lawnmower of the above mentioned type, customarily comprises a fly knife including a plurality of helical cutting blades, each of which should engage and press against the bed knife during each revolution of the fly knife, at a contact point which moves progressively from one end of the cutting edge to the other, and ordinarily the bed knife is thus engaged at all times at a plurality of points along its length, by a corresponding plurality of fly knife cutting blades. Advantageously, the fly knife should bear against the bed knife at all times with a substantial pressure. That pressure which ordinarily should increase with the size of the lawnmower, may vary through a considerable range, but usually may well be of the order of five pounds per foot of bed knife length.

Heretofore it has been customary to journal the rotating fly knife in a framework connecting front and rear ground engaging wheels or other elements and thereby maintained in definite relation to the ground level, to secure the bed knife to a bed knife backing plate or support mounted in the same framework, with provisions for adjustment of the backing plate, and thereby of the bed knife, to compensate for cutting edge wear and to maintain the bed knife cutting edge in suitable parallelism with the axis of fly knife rotation.

In the preferred form of the present invention the bed knife is supported on a backing or supporting member which forms a rigid, non-adjustable element of the framework connecting the front and rear ground engaging elements; and the fly knife is journalled in a separate frame mounted in said framework for bodily movement of the fly knife toward and away from a normal operating position in which the fly knife blades engages and bears against the bed knife; and said framework and frame are connected by anti-chattering or cutter contact regulating means, which permits the fly knife to move toward the bed knife as required to compensate for cutter wear while positively opposing movements of the fly knife away from the bed knife.

By mounting the fly knife in a supporting frame separate from and movable relative to the framework in which the bed knife backing member is incorporated as described, I obtain certain practically important structural and operative advantages, not obtainable with prior lawnmowers in which the bed knife backing or supporting member is adjustably mounted in the framework in which the fly knife is journalled.

In particular, the invention permits of the continuous automatic maintenance of a suitable cutter contact pressure, notwithstanding cutting blade wear, and the jolts and jars to which the lawnmower is subjected as a result of ground unevenness and variations in cutting stress. With the bed knife backing part forming a rigid, non-adjustable portion of the lawnmower framework, the tendency, inherent in prior arrangements to movement of the bed knife cutting edge out of parallelism with the fly knife axis as a result of the bending or relative movements of different portions of the framework, may be practically eliminated.

Furthermore, the bed knife supporting means may be shaped and disposed to accommodate a bed knife of simple cross section, appropriate for use when the bed knife is formed of some known hard alloy material specially suitable for the purpose, but so tough and brittle that it is difficult or impossible to subject it to drilling, punching and other machine operations, to which bed knives are customarily subjected in adapting them for use with the supporting means heretofore used.

The present invention is adapted for use in lawnmowers of various types and forms, and in particular, is equally well adapted for use in lawnmowers of the side or high wheel drive type in which the fly knife axis is at the rear of the axis of the driving wheels, and in lawnmowers in which the fly knife is in front of a driving roller, and in lawnmowers propelled by hand, horse or motor power.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Figure 1:
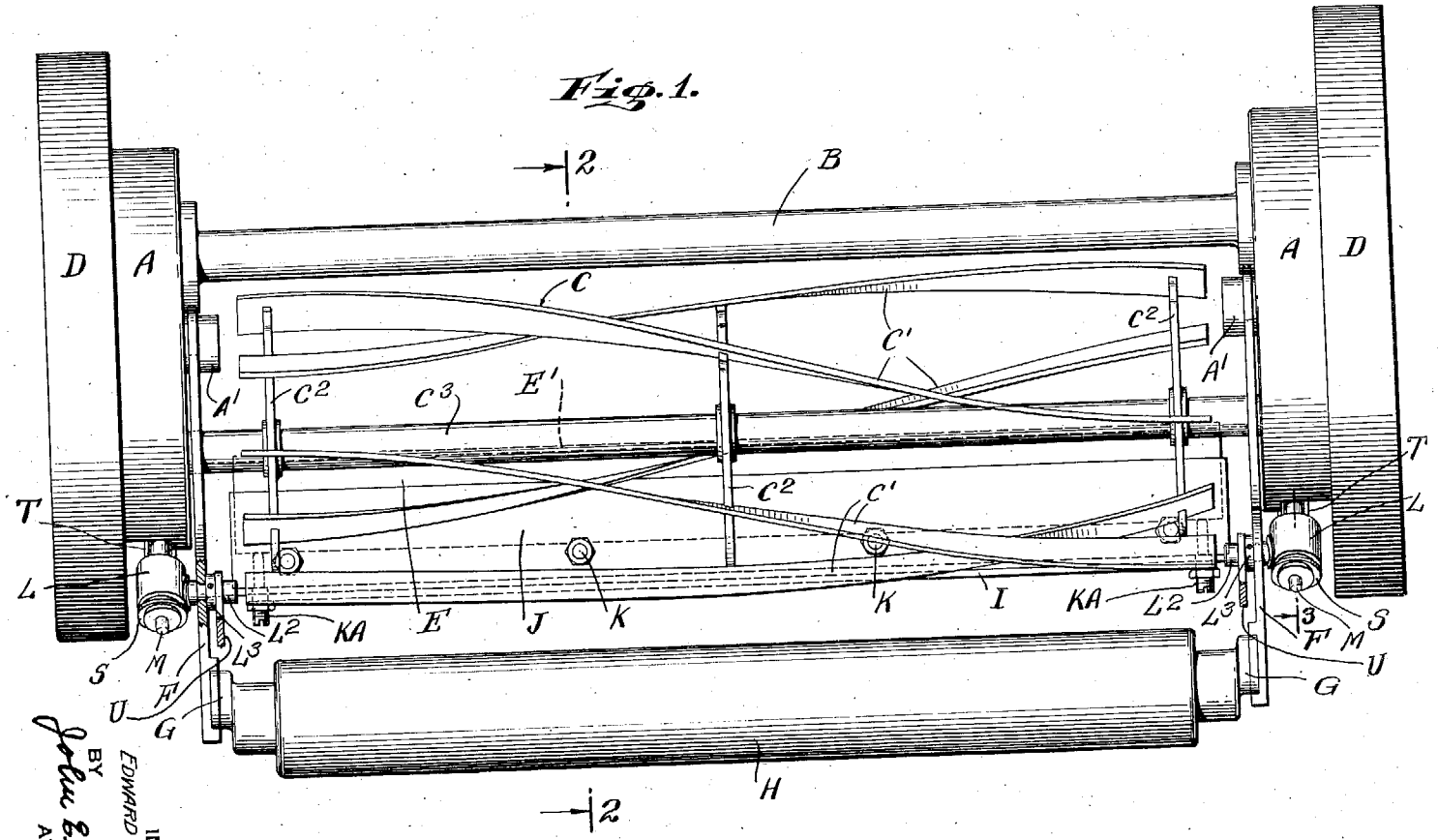
Fig. 1 is a plan view of a lawnmower.
Figure 2:
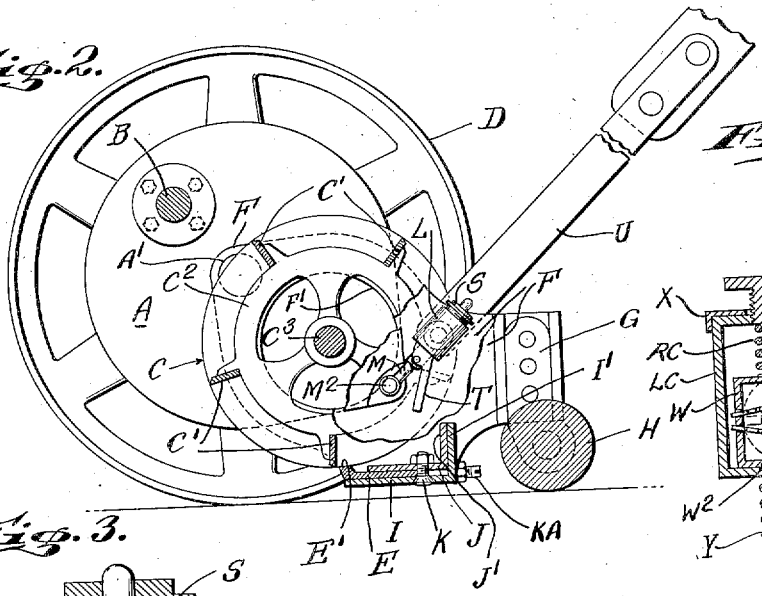
Fig. 2 is an elevation in section on the line 2—2 of Fig. 1.
Figure 3:
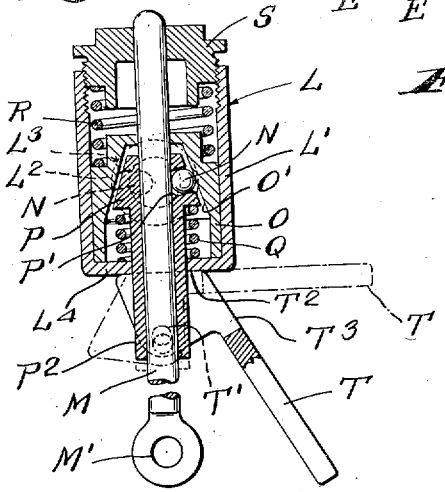
Fig. 3 is an elevation in section on the line 3—3 of Fig. 1 through one of the contact regulators.

In Figs. 1–3 of the drawings, I have illustrated the use of the invention in a so-called high wheel, hand operated lawnmower, comprising a fly knife supporting frame formed by gear case members A, and a main tie member B rigidly connected at its ends to the gear case members A and in front of the revolving cutter or fly-knife C. The latter comprises a plurality of helical cutter blades C′, blade supporting rings $C^2$, and a shaft $C^3$ which has its ends journalled in the gear case members A to turn about an axis parallel to the member B. The two driving wheels D of the lawnmower are located at the outer sides of, and are journalled in, the corresponding gear case members A. As shown, the tie bar B is displaced upwardly and forwardly from the common axis of the members A and wheels D, but in larger machines in which the fly knife is displaced from said axis, the tie bar B may be coaxial with and form an axle for the wheels D. Through gearing within the gear cases A, the rotation of the wheels D rotates the fly knife C at a suitable velocity. In respect to its above mentioned features, the lawnmower may be of any usual known type and form, and is shown as of the particular type and form disclosed in my prior Patent 2,049,883, granted August 4, 1936.

The bed knife E which cooperates with the fly knife C, is supported in a framework shown as comprising side frame members F which have their forward ends pivoted on axle portions A′ of the members A coaxial with the wheels D, and at their rear ends supported by a trailing ground roll H journalled in vertically adjustable bearing members G, carried by the members F. In the preferred construction shown, the members F are rigidly connected by a bed knife support or backing member I, in the form of a flanged steel bar welded at its ends to the members F, and comprising a substantially horizontal body flange and an uprising vertical flange I′ at the rear edge of the body flange. The bed knife E is shown as in the form of a flat bar with an uprising cutting edge rib E′ at its front edge. Advantageously, and as shown, the forward edge of the backing member body extends into the position in which it is beneath and directly supports the cutting edge portion of the knife E. The framework comprising the side frame members F and the bed knife support I, thus connects, and is supported by front ground engaging roller elements formed, as shown, by the driving wheels D, and a rear ground engaging roller element, shown as formed by the roll H.

The flat barlike body of the knife E, is secured to the member I by clamping means which comprise a clamping member J and bolts K. The latter extend through the horizontal body portion of the member I, and through the horizontal body portion of the clamping member J. The member J is a flanged bar having an uprising rear flange J′ abutting against, and advantageously welded to, the uprising flange I′ of the member I. The horizontal portions of the members I and J are spaced apart to form a bed knife receiving slot in front of the bolts K. The latter, when tightened, bend the body of the member J into clamping engagement with bed knife. The welding together of the members I and J adds to the stiffness of the bed plate supporting frame, and does not interfere with the insertion or removal of the bed knife, after the clamping bolts are loosened and the fly knife is raised from its normal position in which its cutting edges bear against the top edge of the bed knife rib E′. The displacement of each end of the bed knife E from the flange I′, is fixed by a corresponding adjusting screw KA mounted in the support I.

The gear case members A and their tie connection B, form a rigid fly knife supporting frame which is angularly adjustable relative to the bed knife supporting frame, about the common axis of the axles A′ and wheels D. To permit such adjustment the side frames F are formed with large central openings F′ through which the fly knife shaft $C^3$ extends. With the fly knife shaft $C^3$ well to the rear of said axis, as shown in the drawings, the weight of the fly knife C gives the latter and its supporting frame a desirable bias for angular movement in the direction to bring the fly knife cutting blades C′ into engagement with the bed knife E, with the desired contact pressure. In operation, however, unevenness in the ground over which the lawnmower moves, and variations in the cutting stresses, tend to cause the fly knife to chatter on, or vibrate toward and away from, the bed knife E. This chattering tendency is prevented, in accordance with the present invention, by contact regulating means acting between the bed knife and fly knife supporting frames, and tending to prevent movement of the fly knife away from the bed knife.

As collectively shown in Figs. 1, 2 and 3, the means regulating the bed and fly knife contact relation, comprise two similar regulators L, one at each side of the lawnmower, and each connecting the adjacent frame member F to the adjacent gear case A. As shown in Fig. 3, each regulator L comprises a rod M having an eye M′ at its lower end which surrounds a stud $M^2$ carried by the corresponding gear case member A, to which the rod M is thus pivotally connected. The rod M extends axially through the hollow cylinder L′ which constitutes the body member of the regulator L, and which has rigidly connected to it a trunnion-like part $L^2$ which extends through the adjacent bed knife supporting frame member F and is held in place by a nut or collar $L^3$ secured to the part $L^2$ by a set screw. The cylinder body L′ of each regulator L includes clutch means normally operative to prevent movement of the rod M axially of said body in the direction required to permit movement of the fly knife away from the bed knife, while freely permitting relative movement of the parts in the opposite direction.

The clutch provisions shown in Fig. 3, are of the ball clutch type, comprising three balls N spaced about, and in engagement with the rod M, and also in engagement with the conical inner surface O′ of a hollow piston-like part O, within the cylinder L′ and surrounding the rod M, and normally engaging the lower end $L^4$ of the cylinder. As shown, the balls N are held in spaced relation with one another by means of a tubular cage or guide member P through which the member M loosely extends, and which comprises an annular head or body portion formed with ball receiving spaces P′ and an elongated sleeve or hub portion $P^2$ which extends through an opening in the cylinder bottom wall $L^4$. A spring Q acting between the wall $L^4$ and the portion of the member P, biases the latter for movement in the direction in which the balls M jam between the surface O′ and the rod M, and thereby hold the latter against axial movement relative to said surface.

As shown in Fig. 3, the member O is normally but yieldingly held against the end wall $L^4$ of the cylinder L′ by a spring R acting between the part O and a member S threaded into the upper end of the body part L. The member S thus forms an adjustable abutment for the upper end of the spring R. By axial adjustment of the member S the tension of the spring R may be varied through a suitable operating range having a minimum value greater than the tension of the spring Q. The spring R thus normally holds the part O in fixed axial relation with the cylinder L′, and thereby normally prevents movement of the fly knife away from the bed knife, but does not prevent movement of the fly knife away from the bed knife on the development of an abnormal force tending to separate the two knives. That abnormal force may result from a shock or jolt forcing the fly knife toward the bed knife, so as to create a knife engaging pressure sufficiently greater than the normal pressure to lock the blades together, with the possible result of stripping gears, or otherwise injuring the lawnmower, but for the safety action of the spring R, which then yields to permit the elevation of the fly knife. The spring R also serves as a relief device when some object caught between the blades, is too strong to be cut or broken by the blade action, and thus subjects the two knives to an abnormal separating force.

Advantageously, means are provided for manually rendering each contact regulator inoperative to oppose movement of the fly knife away from the bed knife. Thus, as shown, by manual adjustment of a release lever T, the ball guide member P may be manually depressed, against the action of the spring Q, to release the normal clutch connection between the parts M and O. The release lever T is bifurcated at one end, and has its bifurcations pivotally connected through trunnion pivots T′, to the lower end of the sleeve portion $P^2$ of the member P. The handle T has two engaging surfaces $T^2$ and $T^3$ inclined at an angle to one another.

In the normal angular position of the handle T, shown in full lines in Fig. 3, the surface $T^2$ bears against the lower end of the member L′ and the ball member P is then held in its normal operative position by the spring Q, with the balls N wedged between the rod M and surface O′. When the lever T is turned into the position shown in dotted lines in Fig. 3, the lever surface $T^3$ engages the lower end of the body member L′, and the guide member P is then displaced downwardly from its normal position, so that the balls N no longer exert their normal clutching action between the parts M and O. With the release lever T in its dotted line position, the fly knife may be moved bodily away from the bed knife E to facilitate inspection, adjustment or repairs, and in particular to permit of bed knife replacement.

Figure 4:
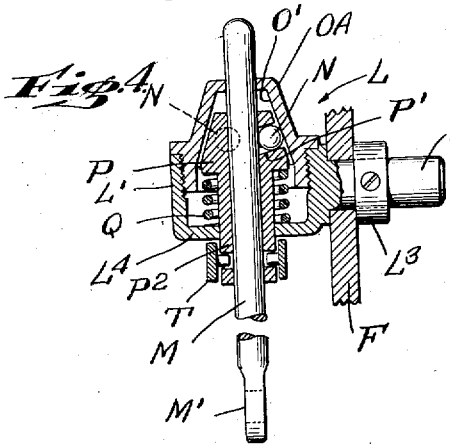

The lawnmower shown in Figs. 1 and 2 is adapted for manual propulsion through a handle member U having its bifurcated lower end pivotally connected to the side frames F through pivots formed by the parts $L^2$ and $L^3$.

Where the automatic safety release function of the spring R shown in Fig. 3 is not required, I may make use of a simpler form of contact regulator such as that shown in Fig. 4, from which the spring R and abutment member S of Fig. 3 are omitted, and in which the member O of Fig. 3 is replaced by a member OA threaded into the upper end of the body cylinder member L′.

Figure 5:
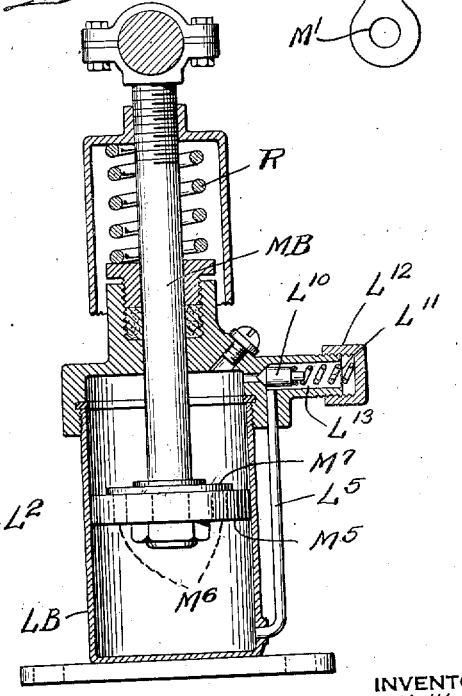

The general anti-chattering clutch action obtainable with the constructions shown in Figs. 3 and 4, can be obtained with very different mechanisms. For example, it can be obtained with such a hydraulic clutch or dashpot mechanism as is shown in Fig. 5. The mechanism shown in Fig. 5 comprises a cylinder LB, which may be connected to the bed knife supporting framework, as the cylinder L′ of Figs. 1–3 is connected to the framework in which the bed knife is mounted. A piston $M^5$ working in the cylinder LB is connected to one end of a piston stem MB which may be connected at its other end to a gear housing A as is the rod M of Figs. 1–3.

The piston $M^5$ is formed with ports $M^6$ for the passage of a glycerin mixture or other suitable dashpot fluid from the lower end to the upper end of the space in the cylinder shell LB. A flexible washer or valve $M^7$ secured against the upper side of the piston is adapted to close the ports $M^6$ against flow downward therethrough. The piston $M^5$ with its ports $M^6$ and the valve $M^7$, thus cooperate to permit free down movement of the stem MB and hence of the fly knife, while automatically opposing chattering up movements of the piston and fly knife.

In the regulator shown in Fig. 5, the portions of the cylinder space above and below the piston are normally filled with the dashpot liquid, and the sort of automatic relief action obtained by the use of the spring R, and movable part O of Fig. 3, may be obtained with the arrangement shown in Fig. 5, by the provision of a by-pass connection $L^5$ between the upper and lower ends of the cylinder space, which is normally closed by a valve $L^{10}$. The valve $L^{10}$ is biased to its closed position by a spring $L^{11}$. The tension of the spring can be varied by the angular adjustment of a threaded cap member $L^{12}$ closing the outer end of a spring chamber $L^{13}$, and determines the liquid pressure in the upper end of the cylinder LB required to force the valve $L^{10}$ away from its seat, and thereby permit liquid flow through the by-pass from the upper end to the lower end of the cylinder LB. Such flow permits an up movement of the piston $M^5$, and thereby of the fly knife supporting frame, to which the upper end of the piston stem MB is connected.

Figure 6:
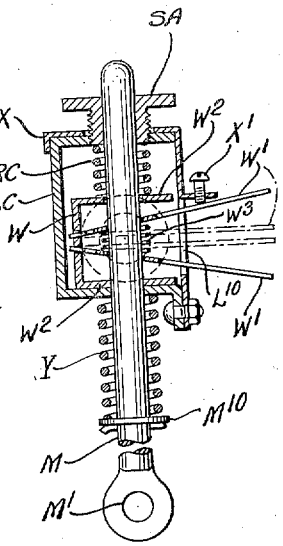
Figs. 4, 5, and 6 are elevations taken similarly to Fig. 3 and each illustrating a different modification of the regulator shown in Fig. 3.

In the regulator shown in Fig. 6, manually controlled means are employed to releasably lock the fly knife in the position in which its blades bear with suitable pressure against the bed knife. Said means comprises a clutch mechanism mounted within a cylinder LC which may be exactly like the cylinder L′ first described, except that it is formed with an opening $L^{10}$ at one side through which clutch parts W′ extend. Each clutch part W′ has its end within the cylinder LC pivotally connected to the base or body portion of a yoke shaped clutch member W which has its parallel arms $W^2$ formed with apertures large enough for the free movement therethrough of the rod M, when the members W′ are moved toward one another into their positions shown in dotted lines in Fig. 6.

Normally, the members W′ are spread apart as shown in full lines in Fig. 6 by a spring $W^3$. When so spread apart, each member W′ is in gripping relation with the rod M, and the members W′ then prevent movement of the rod M in either direction so long as the yoke member W is held against one end of the cylinder LC by the spring RC as shown in Fig. 6. The spring RC serves the same release purpose shown by the spring R shown in Fig. 3. As shown, the spring RC acts against an abutment member SA threaded in an opening in the end of the cylinder LC.

As shown, the normal position of the uppermost of the two members W′ shown in Fig. 6 is fixed by an adjustable stop X′ threaded through a bracket member X secured to the cylinder LC. A spring Y is shown as acting between the member LC and an abutment shoulder $M^{10}$ carried by the member M adjacent its eye M′.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A lawn mower comprising in combination, front and rear ground engaging roller elements, a framework connecting said elements and comprising side frame members to which the front roller elements at the opposite sides of the framework are pivotally connected for rotation about their common axis and also comprising a rear roller element support, and a bed knife support extending between and having its ends rigidly connected to and in fixed relation with said side frame members, whereby said framework is made rigid, a bed knife rigid on said support, a revoluble fly knife normally above and engaging said bed knife and having central shaft extensions at its ends, gear case members pivotally related to the front roller elements and the adjacent side frames for angular adjustment about the said common axis of said front roller elements and said framework, means rigidly connecting said gear case members to form a rigid fly knife supporting frame pivotally related to said framework with said shaft extensions journalled in said gear case members, said side frame members being arranged to give clearance for said shaft extensions as said gear case members are turned about said axis to turn said fly knife toward and away from said bed knife, and means operatively connecting said framework and frame and normally maintaining the fly knife in engagement with the bed knife.

2. A lawnmower as specified in claim 1, in which the said means comprises a clutch interposed between said frame and framework permitting their relative movements in the direction to move the fly knife toward said bed knife and tending to prevent their relative movements in the opposite direction.

3. A lawnmower as specified in claim 1, in which the said means comprises a clutch interposed between said frame and framework permitting their relative movements in the direction to move the fly knife toward said bed knife and tending to prevent their relative movements in the opposite direction, and manually operable means for rendering said clutch inoperative to prevent movement of the fly knife away from the bed knife.

4. A lawnmower as specified in claim 1, in which the said means comprises a connection between said frame and framework including a clutch interposed between said frame and framework permitting their relative movements in the direction to move the fly knife toward said bed knife and tending to prevent their relative movements in the opposite direction, and also including means yielding to permit such relative movement in the opposite direction when subjected to an abnormal force.

5. A lawnmower as specified in claim 1, in which the said means comprises a part connected to said frame, a part connected to said framework, clutch means permitting relative movements of said parts in one direction and opposing relative movement of said parts in the opposite direction.

6. A lawnmower as specified in claim 1 in which the said means comprises a part, a connection between said part and said frame, a second part, a connection between said second part and framework, clutch means normally operative to prevent relative movement of said parts in one direction while permitting such relative movement in the opposite direction, one of said connections including a spring adapted to yield and permit relative movement of said parts in said one direction.

7. A lawnmower as specified in claim 1 in which the said means comprises a part pivotally connected to said framework, a part pivotally connected to said frame, one of said parts including a rod-like portion and the other of said parts being formed with a conical chamber in which said rod is axially disposed and clutch balls tending to wedge between the periphery of said rod and the wall of said cavity and thereby prevent relative movement of said parts in one direction.

8. A lawnmower as specified in claim 1 in which the said means comprises a part pivotally connected to said framework, a part pivotally connected to said frame, one of said parts including a rod-like portion and the other of said parts being formed with a conical chamber in which said rod is axially disposed, clutch balls, and resilient means tending to wedge said balls between the periphery of said rod and the wall of said cavity and thereby prevent relative movement of said parts in one direction.

9. A lawnmower as specified in claim 1 in which the said means comprises a part pivotally connected to said frame, a part pivotally connected to said framework, and one of said parts including a rod-like portion and the other of said parts being formed with a conical chamber in which said rod is axially disposed and clutch balls tending to wedge between the periphery of said rod and the wall of said parts in one direction, and means manually operable to retract said balls and thereby permit relative movements of said parts in either direction.

10. A lawn mower comprising in combination front and rear ground engaging roller elements, a framework connecting said elements and including side frame members and a horizontally disposed bed knife supporting member rigidly connected to said side frame members, a bed knife rigidly mounted on said supporting member, a revolvable fly knife normally above and engaging said bed knife, and having central shaft extensions at its ends, and fly knife supporting means movable relative to said framework to move said fly knife toward said bed knife as required to compensate for knife wear, said fly knife supporting means comprising rigidly connected members lying outside of the said side frame members in which said shaft extensions are journalled.

11. A lawnmower as specified in claim 10, in which the bed knife supporting member extends beneath and directly supports the bed knife adjacent the cutting edge of the latter.

12. A lawnmower as specified in claim 10, in which the bed knife supporting member has a bed knife supporting beneath and directly supporting the bed knife along substantially the entire length and width of the latter.

13. A lawnmower as specified in claim 10 in which the supporting member comprises a supporting surface underlying and directly supporting the bed knife, a clamping member engaging the upper side of the bed knife and clamping bolts connecting said members and located at one side of said surface.

14. A lawnmower as specified in claim 10, in which the bed knife supporting member comprises two angle bars each with an unbalanceable vertical flange rigidly secured to the vertical flange of the other and each with a substantially horizontal flange spaced from the horizontal flange of the other to form a horizontal slot or kerf into which the bed knife extends.

15. A lawnmower comprising in combination front and rear ground engaging roller elements, a framework connecting said elements and comprising side frame members and a bar-like member having its ends welded to said side frame members and having a substantially horizontal bed knife supporting surface, a bed knife on and clamped against said surface, a revolvable fly knife normally above and engaging said bed knife, fly knife supporting means movable relative to said frame work to move said fly knife toward and away from said bed knife, and means normally operative to maintain said fly knife in engagement with the bed knife.

EDWARD H. WORTHINGTON